May 26, 1970 — M. ANNIS ET AL — 3,514,190
MICROSCOPE
Original Filed Sept. 1, 1964
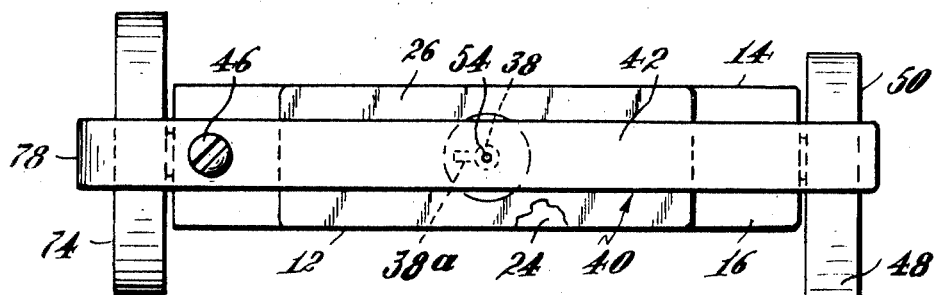
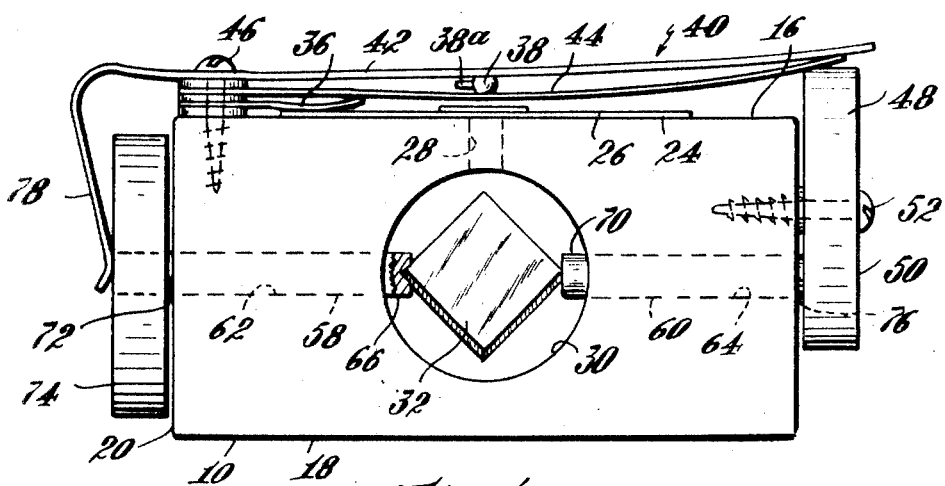
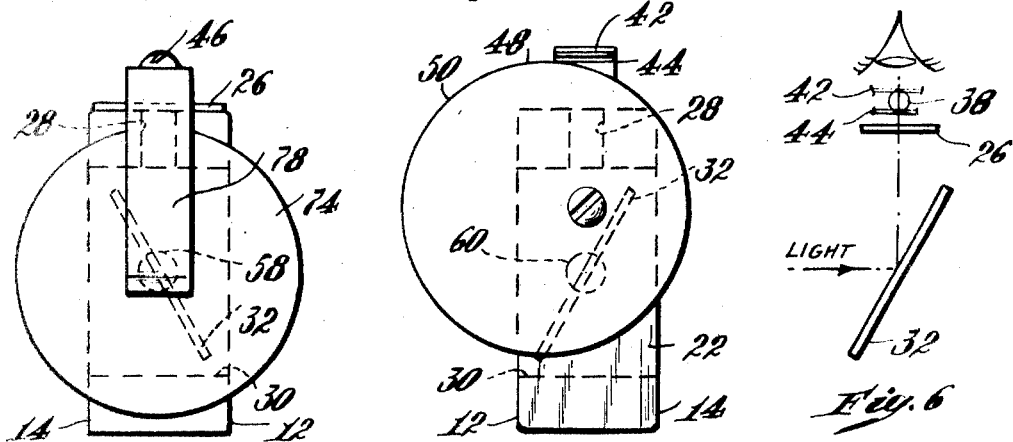
INVENTORS
Martin Annis
George W. Clark
Edwin C. Williams, Jr.
by Wolf, Greenfield & Sacks ATT'YS United States Patent Office 3,514,190
Patented May 26, 1970

3,514,190
MICROSCOPE
Martin Annis, Newtonville, George W. Clark, Brookline, and Edwin C. Williams, Jr., Southboro, Mass., assignors to American Science and Engineering, Inc., Cambridge, Mass., a corporation of Massachusetts
Continuation of application Ser. No. 393,665, Sept. 1, 1964, now Patent No. 3,391,975, dated July 9, 1968. This application July 8, 1968, Ser. No. 745,081
The portion of the term of the patent subsequent to July 9, 1985, has been disclaimed
Int. Cl. G02b 3/00
U.S. Cl. 350—238                                11 Claims

ABSTRACT OF THE DISCLOSURE

A microscope includes a block formed with a large opening accommodating a mirror pivotally mounted about an axis orthogonal to the axis of a small opening formed in the block that intersects with the large opening so that the mirror may reflect light into the small opening. A lens means is supported above the small opening. Cam means controls the positioning of the lens means in a direction along the axis of the small opening to permit focusing of the lens along a slide plane adjacent to the top of the opening. A slide support helps keep a slide in position in the slide plane between the small opening and the lens means.

BACKGROUND OF THE INVENTION

This invention is a continuation of application Ser. No. 393,665, filed Sept. 1, 1964, now Pat. No. 3,391,975.

This invention relates to microscopes and has for its principal objects to provide a microscope for elementary student use; to provide a microscope which is of very simple construction and yet affords a high degree of magnification and resolution; to provide a microscope in which the magnification may be increased or decreased to suit the need without difficulty or expense; to provide a microscope in which the component parts are readily available and require no precision manufacturing techniques to afford the aforesaid magnification and resolution; to provide a microscope which is so simple in its make-up and operation as to require no instructions for its use; to provide a microscope which is inexpensive enough to enable furnishing each member of the class with a microscope for his own individual use and which may be replaced if accidentally damaged with little expense; and to provide a microscope which is sturdy, reliable and attractive in appearance.

SUMMARY OF THE INVENTION

According to the invention, main support means is formed with a main opening supporting a mirror pivotally mounted about an axis perpendicular to a viewing axis. The main support means is formed with an opening along the viewing axis communicating with the main opening. Lens means is carried by a lens support for movement along the viewing axis to provide focusing. Cam means contacts the lens support means to control the position of the lens along the viewing axis to permit focusing of the lens upon a slide plane immediately adjacent to the viewing opening.

In a more specific form of the invention, the microscope comprises a support including a stage containing an opening over which a slide may be placed, a lens, a flexible holder mounting the lens above the opening in the stage, means fixing one end of the holder to the support, a cam on the support with which the opposite end of the holder is engaged and by means of which the holder may be raised and lowered with respect to the stage, a mirror, and means for supporting the mirror below the opening in the stage for transmitting light through the opening to illuminate the slide from the underside. The holder comprises superposed, flat, elongate parts secured at one end to the support and resting at their opposite ends on the peripheral surface of the cam which is an eccentrically mounted disc manually rotatable to raise and lower the holder and hence the lens. The parts contain aligned apertures and the lens, which is in the form of a glass bead, is lodged between the parts by engagement of diametrically opposed portions thereof with the respective apertures, the latter providing sights through the parts and the interposed bead. The mirror is mounted below the opening between the ends of axially spaced trunnions, the latter being mounted on the support for rotation and axial movement relative to each other. The adjacent ends of the trunnions contain recesses within which set the diagonal corners of the mirror. The remote end of one trunnion bears against the inside of the cam disc and the remote end of the other trunnion has fixed to it a circular disc by means of which it may be rotated. A spring secured to the support in engagement with the latter disc operates by engagement therewith to thrust the trunnions axially toward the cam disc so as to cause the end of the trunnion having engagement with the cam disc to frictionally resist rotation thereof and so as to clamp the mirror between the adjacent ends.

The glass bead lens is in the order of 5/32 of an inch in diameter, is comprised of lime glass, may be readily removed from between the superposed parts of the flexible holder and replaced with a bead of different size to obtain different magnification, and the radius of movement of the bead to and from the stage is in the order of twelve times the diameter of the bead. The support is in the form of a block of wood, the holder in the form of flat metal springs, the cam and disc are wood, the mirror a piece of silvered glass and the trunnions wooden dowels. The foregoing component parts however may be comprised of any suitable material which is readily available.

The invention will now be described in greater detail with reference to the accompanying drawings wherein:

BRIEF DESCRIPTION OF THE DRAWING

FIG. 1 is a front elevation of the microscope;
FIG. 2 is a top view of FIG. 1;
FIG. 3 is an elevation taken from the left end of FIG. 1;
FIG. 4 is an elevation taken from the right end of FIG. 1;
FIG. 5 is an enlarged fragmentary section showing a portion of the lens holder and lens;
FIG. 6 diagrammaticallyy illustrates the path of light from the mirror through the slide, apertures in the lens holder and lens to the eye; and
FIG. 7 is a plan view of a slide showing a specimen mounted thereon.

DETAILED DESCRIPTION OF PREFERRED EMBODIMENTS

Referring to the drawings, the microscope has a support 10 of rectangular configuration having spaced parallel side surfaces 12 and 14 and spaced parallel top, bottom and end surfaces 16, 18, 20 and 22. The surface 16 is uniformly flat and provides a stage 24 upon which may be placed in a glass slide 26, or the like, of conventional kind. This stage has a vertical opening 28 which extends downwardly from its surface into a circular opening 30 extending at right angles thereto through the surfaces 12 and 14. A rectangular mirror 32 comprised of a piece of silvered glass is mounted in the opening 30 below the opening 32 for the purpose of supplying light to the underside of the slide to illuminate a specimen 34 attached to the slide as shown in FIG. 7. A flat flexible spring finger 36 (FIG. 1) fastened to the surface 16 of the support provides for removably holding the slide on the stage with the specimen positioned above the opening 28.

A lens 38 in the form of a glass bead is supported above the stage for movement to and from the stage by a holder 40. The holder comprises superposed, flat, elongate metal parts 42 and 44 of flexible resilient material and these are fastened at one end to the upper surface 16 adjacent one end of the support by means of a screw 46 with suitable spacers in the form of washers therebetween. The opposite ends of the parts 42 and 44 rest on the peripheral surface 48 of a cam 50 which is in the form of a circular disc eccentrically mounted on the end 22 of the support by means of a screw 52 which permits rotating the cam and thus raising and lowering the lens holder relative to the stage and the specimen supported slide resting thereon.

The parts 42 and 44 have aligned apertures 54 and 56 (FIG. 5) therein and the lens 38 is lodged between these parts with diametrically opposed portions engaged within the apertures thus fixing the position of the lens with respect to the opening 28 and yet enabling easily removing the lens for substitution of a lens of a larger or smaller diameter. The lens shown herein is in the form of a glass bead having a diameter in the order of $5/32$ of an inch. The glass bead is comprised of soft lime glass and different diameters may be employed, for example from $3/32$ up to $7/32$ depending upon the magnification desired. Conveniently, the glass bead has a small tail 38a projecting from it formed in its manufacture which affords a handle and which facilitates removing and replacing the bead. The holder is so proportioned that adjustment of the lens to and from the stage is about a radius approximately twelve times the diameter of the bead. The apertures 54 and 56 are of relatively small diameter, for example in the order of $1/16$ of an inch, and provide a sight through the bead which restricts sighting close enough to the diameter of the bead to eliminate aberration. The diameter of the apertures may range from $3/64$ to $5/64$ depending upon the size of the bead.

The mirror 32 is supported between axially spaced trunnions 58 and 60 parallel to the surface 16 within bores 62 and 64 for rotation about their axes and movement axially relative to each other. The adjacent ends 66 and 70 of the trunnions are recessed to receive the diagonal corners of the mirror to enable frictionally clamping the mirror between them. The remote end 72 of the trunnion 58 extends outwardly beyond the end 20 and has fastened to it a circular disc 74 by means of which the trunnion may be rotated and, in turn, rotate the mirror. The remote end 76 of the trunnion 60 extends beyond the end 22 and bears upon the inner surface of the cam 50. A spring finger 78, which conveniently forms an integral extension of the part 42, bears against the outer face of the disc 74, preferably at the center, and by such yielding engagement urges the trunnion 58 toward the trunnion 60 to press the outer end 76 of the trunnion 60 into frictional engagement with the cam 50 and at the same time to clamp the mirror between the adjacent ends 66 and 70. The frictional engagement of the end 76 with the trunnions 60 with the cam prevents accidental displacement without interfering with rotation of the cam when desired for the purpose of focusing the lens on the specimen. Engagement of the terminal end of the spring 78 with the disc 74 prevents displacement of the mirror without interfering with adjustment of the mirror when such adjustment is desired to obtain maximum lighting.

As herein illustrated, the support is in the form of a wooden block, the cam and disc are comprised of wood, the trunnions are wooden dowels, the spring finger 36 and parts 42 and 44 of the holder, including the spring finger 78, are comprised of flat spring metal, the lens is a soft lime glass bead, and the mirror is a piece of silvered glass or stainless steel. It is to be understood however that the foregoing parts may be made entirely of plastic or of any other suitable material or combination of material which will embody the constructional features described above.

It should be understood that the present disclosure is for the purpose of illustration only and that this invention includes all modifications and equivalents which fall within the scope of the appended claims.

We claim:
1. A microscope comprising,
main support means formed with a main opening therein and a viewing opening embracing a viewing axis and communicating with said main opening,
mirror means for directing light along said viewing axis through said viewing opening,
mirror support means carried by said main support means for pivotally supporting said mirror means within said main opening for pivotal movement about an axis perpendicular to said viewing axis,
lens means embracing said viewing axis,
lens support means carried by said main support means selectively positioning said lens means along said viewing axis to focus said lens upon a slide plane immediately adjacent to said viewing opening,
and slide support means including said main support means for supporting a slide in said slide plane,
said mirror support means comprising,
a pair of trunnions with means urging said trunnions together to hold said mirror means clamped therebetween,
and means for rotating one of said trunnions to adjust the plane of said mirror means relative to that of said viewing axis.

2. A microscope comprising,
main support means formed with a main opening therein and a viewing opening embracing a viewing axis and communicating with said main opening,
mirror means for directing light along said viewing axis through said viewing opening,
mirror support means carried by said main support means for pivotally supporting said mirror means within said main opening for pivotal movement about an axis perpendicular to said viewing axis,
lens means embracing said viewing axis,
lens support means carried by said main support means selectively positioning said lens means along said viewing axis to focus said lens upon a slide plane immediately adjacent to said viewing opening,
and slide support means including said main support means for supporting a slide in said slide plane,
said main support means being a unitary block formed with said main opening and said viewing opening.

3. A mircroscope in accordance with claim 2 wherein said lens support means comprises cantilever means and cam means rotatably mounted upon said block in contacting relationship with said cantilever means for selectively positioning the latter and thereby said lens means.

4. A microscope in accordance with claim 1 wherein said main support means comprises a block having spaced broad faces embracing said main and viewing openings, and openings accommodating said trunnions,
and means associated with said lens support means operable to adjust said lens means along said viewing axis.

5. A microscope in accordance with claim 4 wherein said block has spaced narrow and end faces joining said broad faces,
said viewing opening being formed in said block and extending from a narrow face to said main opening,
said block being formed with first and second holes extending from a first and a second of said end faces respectively to said main opening, said lens support means being adjacent to said a narrow face, said lens support means being movable toward and from said narrow face so as to move the lens substantially linearly relative to said viewing axis, said pair of trunnions being mounted in respective ones of said first and second holes with their inner ends extending into said mian opening, said inner ends having means for carrying said mirror means, said means urging said trunnions together being yieldable so as to hold said mirror means clamped between said inner ends for rotation about the axis of said trunnions.

6. A microscope in accordance with claim 5 wherein said lens support means comprises cantilever means and cam means rotatably mounted upon said block in contacting relationship for selectively positioning the latter and thereby said lens means.

7. A microscope in accordance with claim 6 wherein said cam means comprises a cam disc mounted on one of said end faces for rotation about an eccentric to its center with a portion of its peripheral edge in engagement with said cantilever means and a portion of its lateral surface overlapping the end of the trunnion situated in the one of said first and second holes at that end of said block and comprising means for holding the trunnion in the latter hole axially stationary with the inner end of the latter trunnion at a predetermined position in said main opening.

8. A microscope in accordance with claim 6 wherein a disc is fixed to the outer end of one of said trunnions and comprises means for rotating the latter trunnion to adjust the angle of said mirror means relative to said viewing axis.

9. A microscope in accordance with claim 7 wherein a disc is fixed to the outer end of one of said trunnions and comprises means for rotating the latter trunnion to adjust the angle of said mirror means relative to said viewing axis.

10. A microscope in accordance with claim 7 wherein said cantilever means is secured at one end and supported at its other end by engagement with said cam disc.

11. A microscope in accordance with claim 10 wherein said cantilever means comprises two narrow flexible members supported in closely spaced relation and containing registering openings embracing said viewing axis and said lens means comprises a magnifying transparent bead supported between said two flexible members in said registering openings urging the latter members apart.

References Cited

UNITED STATES PATENTS

| 2,013,422 | 9/1935 | Powell | 350—238 |
| 2,080,172 | 5/1937 | Fiske | 350—241 |
| 2,110,653 | 3/1938 | Powell | 350—238 |
| 3,391,975 | 7/1968 | Annis et al. | 350—238 |

FOREIGN PATENTS

| 131,216 | 1949 | Australia. |

DAVID SCHONBERG, Primary Examiner

M. J. TOKAR, Assistant Examiner

U.S. Cl. X.R.

350—255